(12) United States Patent
Huard

(10) Patent No.: US 12,459,448 B1
(45) Date of Patent: Nov. 4, 2025

(54) SIMULATED HAIR FOR A VEHICLE

(71) Applicant: Edward Huard, Simcoe (CA)

(72) Inventor: Edward Huard, Simcoe (CA)

( * ) Notice: Subject to any disclaimer, the term of this patent is extended or adjusted under 35 U.S.C. 154(b) by 414 days.

(21) Appl. No.: 18/097,580

(22) Filed: Jan. 17, 2023

(51) Int. Cl.
*B60R 13/00* (2006.01)
(52) U.S. Cl.
CPC .................................. *B60R 13/00* (2013.01)
(58) Field of Classification Search
CPC ......... B50P 7/0823; B60R 13/04; B60R 13/00
See application file for complete search history.

(56) References Cited

U.S. PATENT DOCUMENTS

| | | | |
|---|---|---|---|
| 3,342,189 A * | 9/1967 | Houston | A41G 5/004 |
| | | | D28/92 |
| D442,746 S | 5/2001 | Belcher | |
| D501,280 S | 1/2005 | Kole | |
| 7,309,141 B2 | 12/2007 | Scott | |
| 8,470,414 B2 | 6/2013 | Custer | |
| 2007/0113446 A1 | 5/2007 | Shwartz | |
| 2012/0326462 A1 | 12/2012 | Small | |
| 2016/0090029 A1 * | 3/2016 | Levytsky | B60J 11/06 |
| | | | 116/28 R |
| 2021/0061191 A1 * | 3/2021 | King | B60R 13/04 |
| 2021/0158018 A1 | 5/2021 | Small | |

FOREIGN PATENT DOCUMENTS

WO        2021097405        5/2021

OTHER PUBLICATIONS

This Fiat 500 is Twice the Hairiest Car in the Word, Still a Work of Art (Year: 2020).*
https://camelcamelcamel.com/product/B08LD8CJ8D?context=search&active=new (Year: 2020).*
BEYOURD Buckles and Straps Set 1 Amazon Price History (Year: 2022).*

* cited by examiner

*Primary Examiner* — Lori Lyjak
(74) *Attorney, Agent, or Firm* — Kyle A. Fletcher, Esq.

(57) ABSTRACT

The simulated hair for a vehicle is a decorated vehicle. The simulated hair for a vehicle comprises a forward strap structure, an aft strap structure, a sacrificial textile, a decorative structure, and a vehicle. The vehicle further comprises a vehicle cab and a vehicle roof. The decorative structure, the forward strap structure, and the aft strap structure attach to the sacrificial textile. The forward strap structure and the aft strap structure secure the sacrificial textile and the decorative structure to the vehicle roof.

14 Claims, 8 Drawing Sheets

SIMULATED HAIR FOR A VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of externally visible ornament for a vehicle. (B60R13/04)

SUMMARY OF INVENTION

The simulated hair for a vehicle is a decorated vehicle. The simulated hair for a vehicle comprises a forward strap structure, an aft strap structure, a sacrificial textile, a decorative structure, and a vehicle. The vehicle further comprises a vehicle cab and a vehicle roof. The decorative structure, the forward strap structure, and the aft strap structure attach to the sacrificial textile. The forward strap structure and the aft strap structure secure the sacrificial textile and the decorative structure to the vehicle roof.

These together with additional objects, features and advantages of the simulated hair for a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the simulated hair for a vehicle in detail, it is to be understood that the simulated hair for a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the simulated hair for a vehicle.

It is therefore important that the claims be regarded as including such equivalent construction insofar as they do not depart from the spirit and scope of the simulated hair for a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
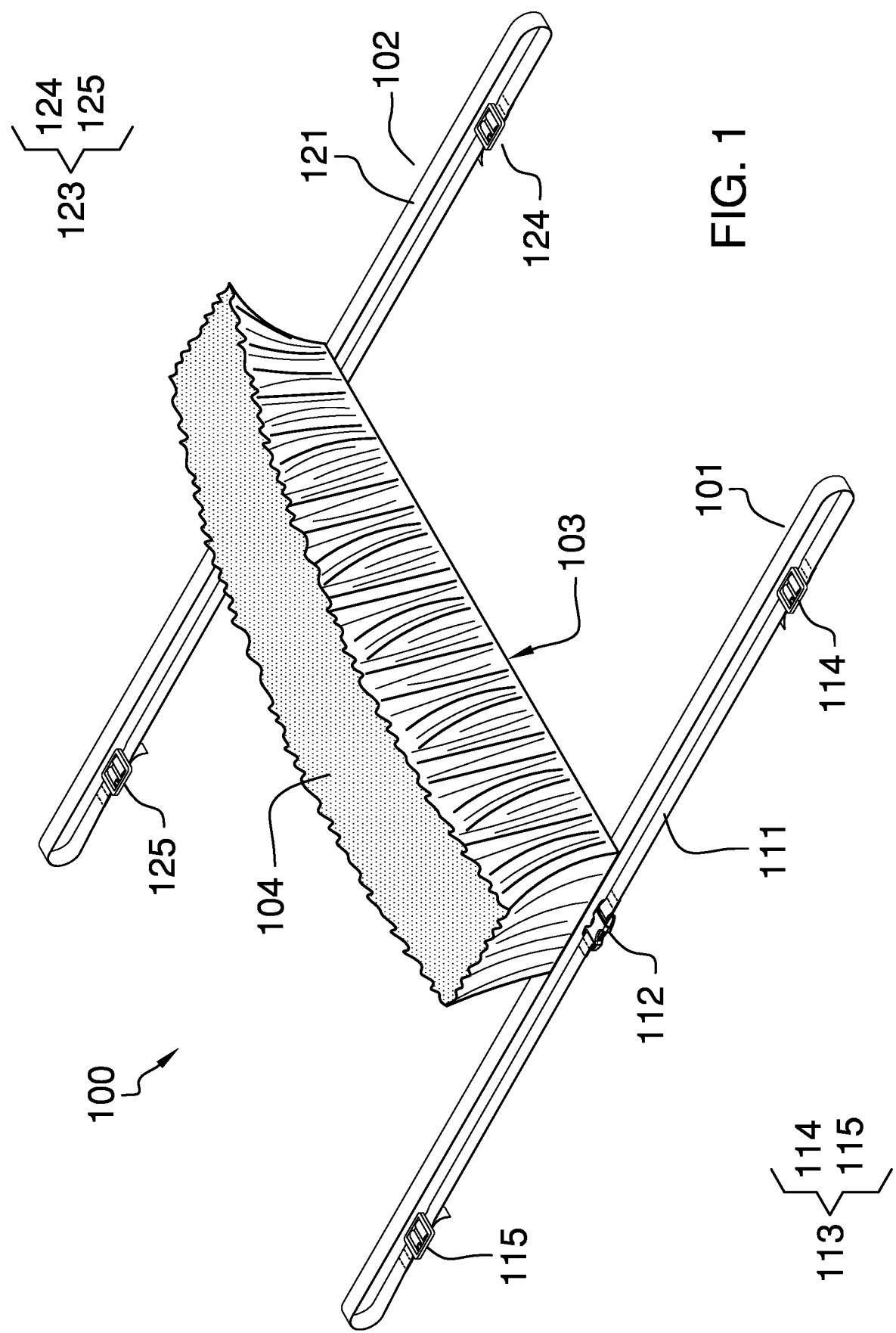
FIG. 1 is a perspective view of an embodiment of the disclosure.
Figure 2:
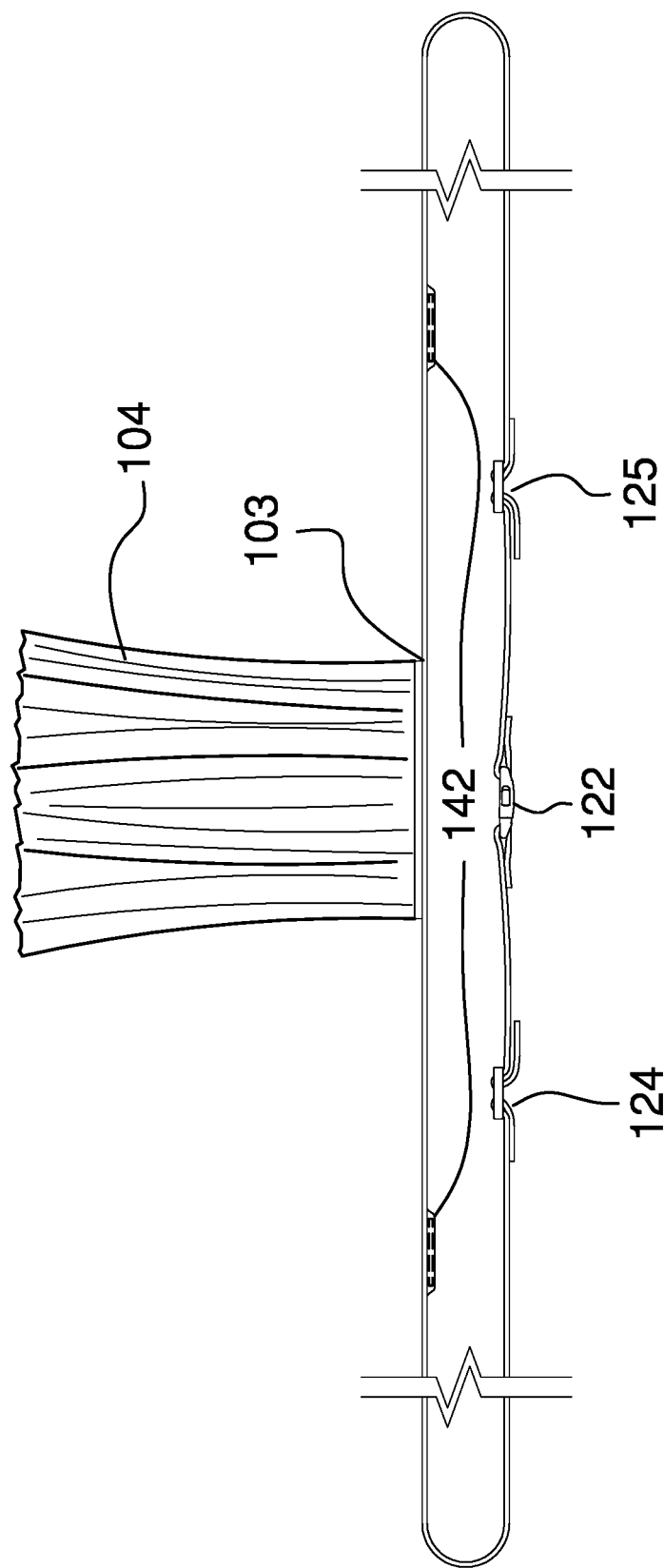
FIG. 2 is a front view of an embodiment of the disclosure.
Figure 3:
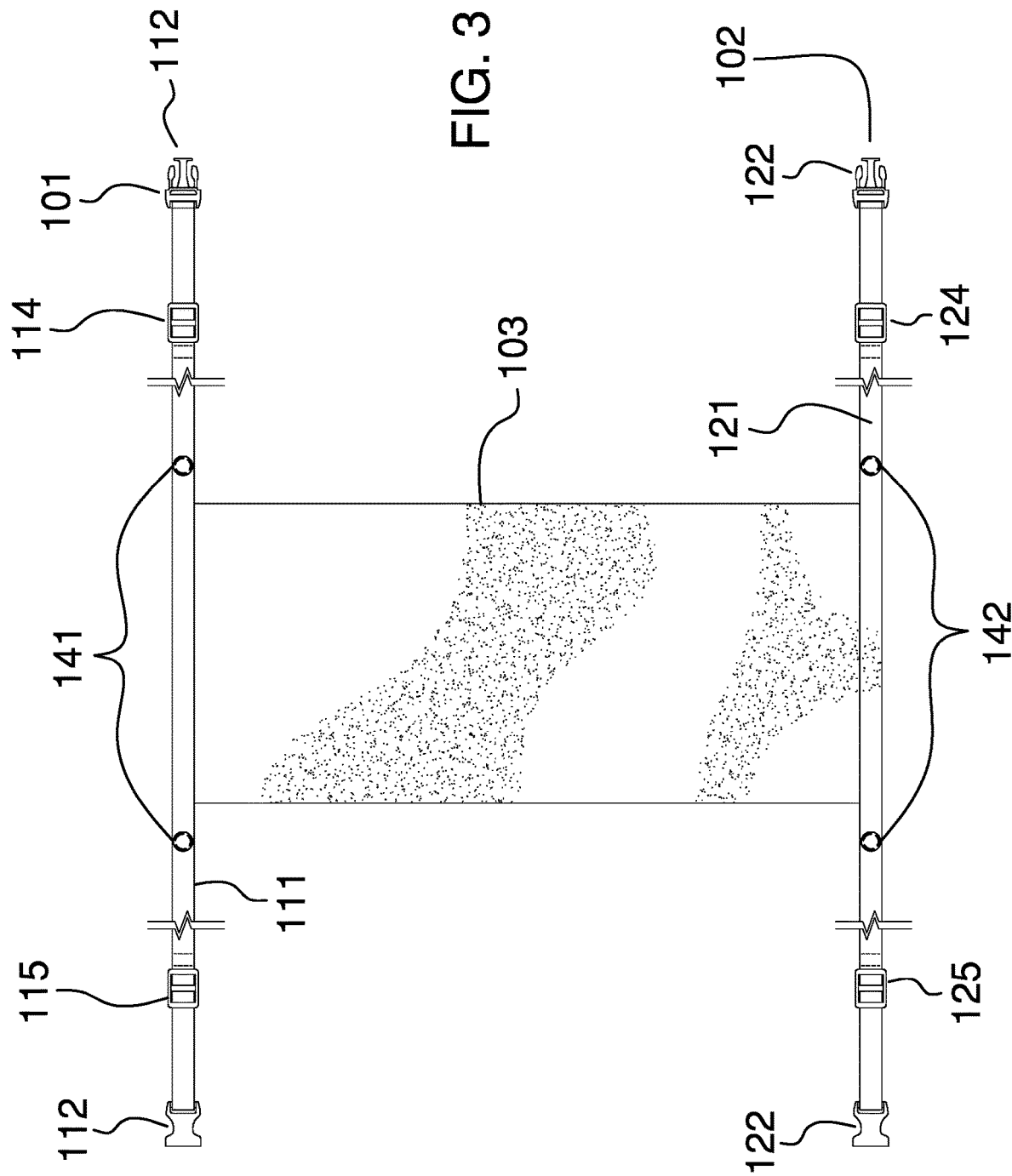
FIG. 3 is a bottom of an embodiment of the disclosure.
Figure 4:
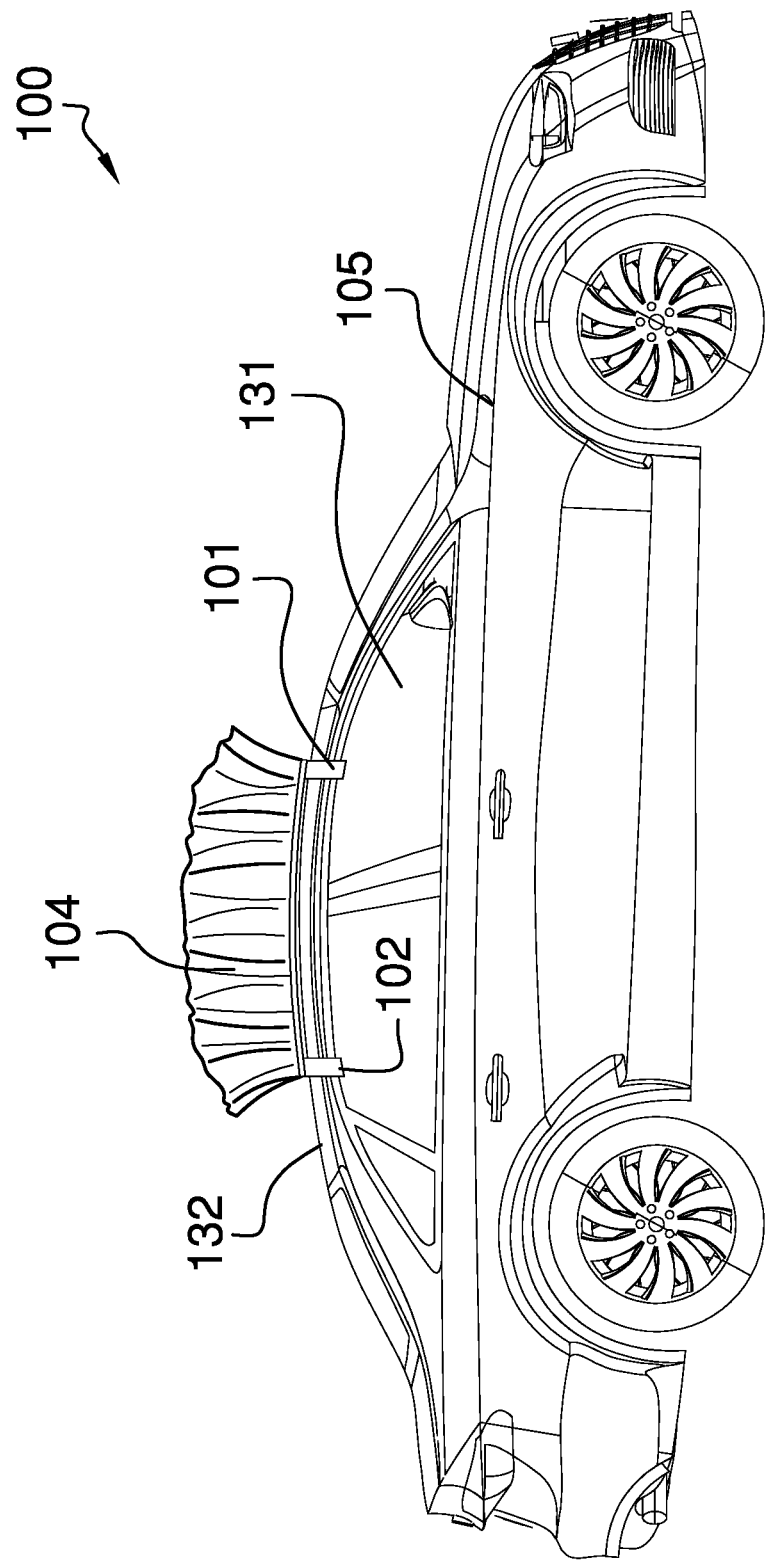
FIG. 4 is a side view of an embodiment of the disclosure.
Figure 5:
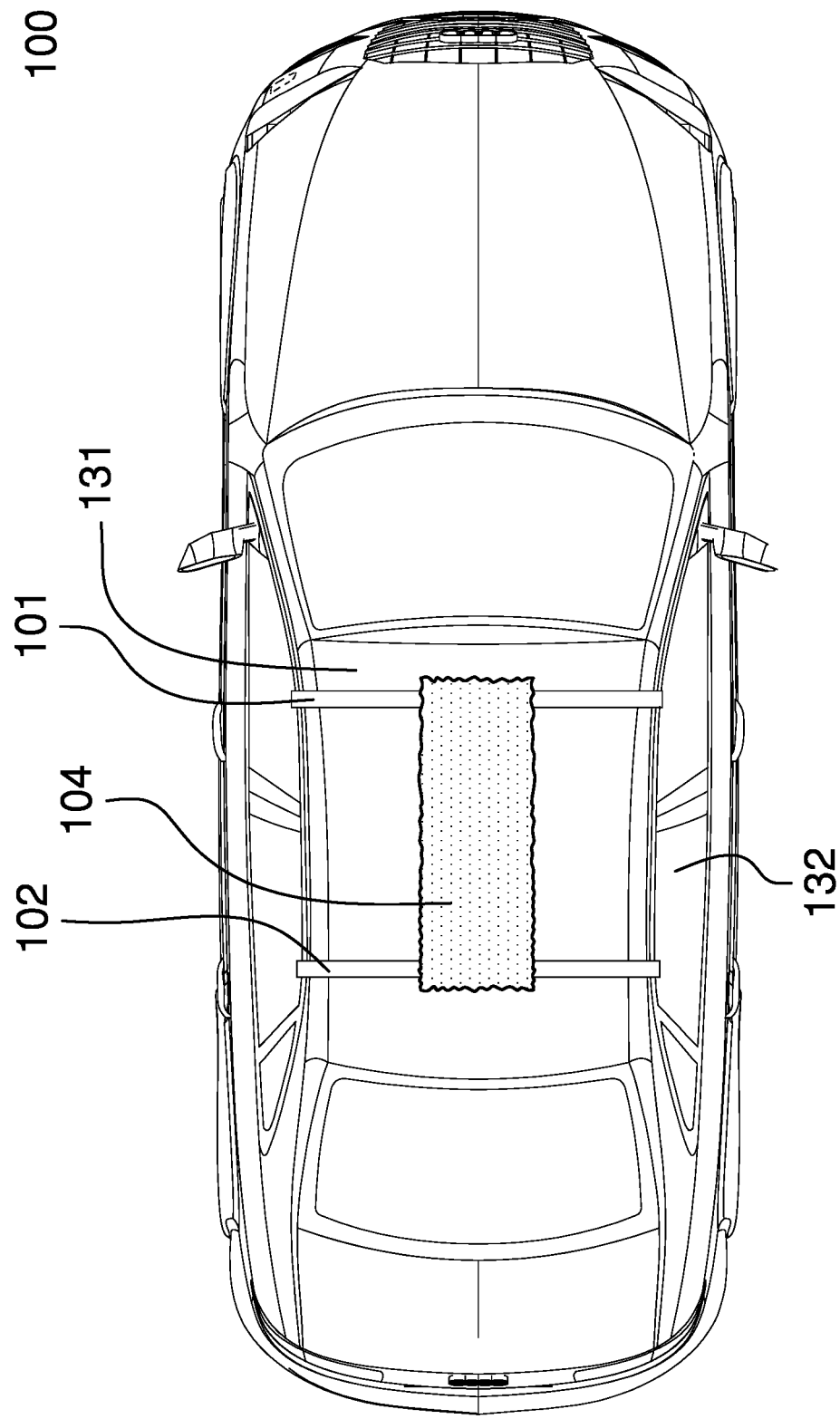
FIG. 5 is a top view of an embodiment of the disclosure.
Figure 6:
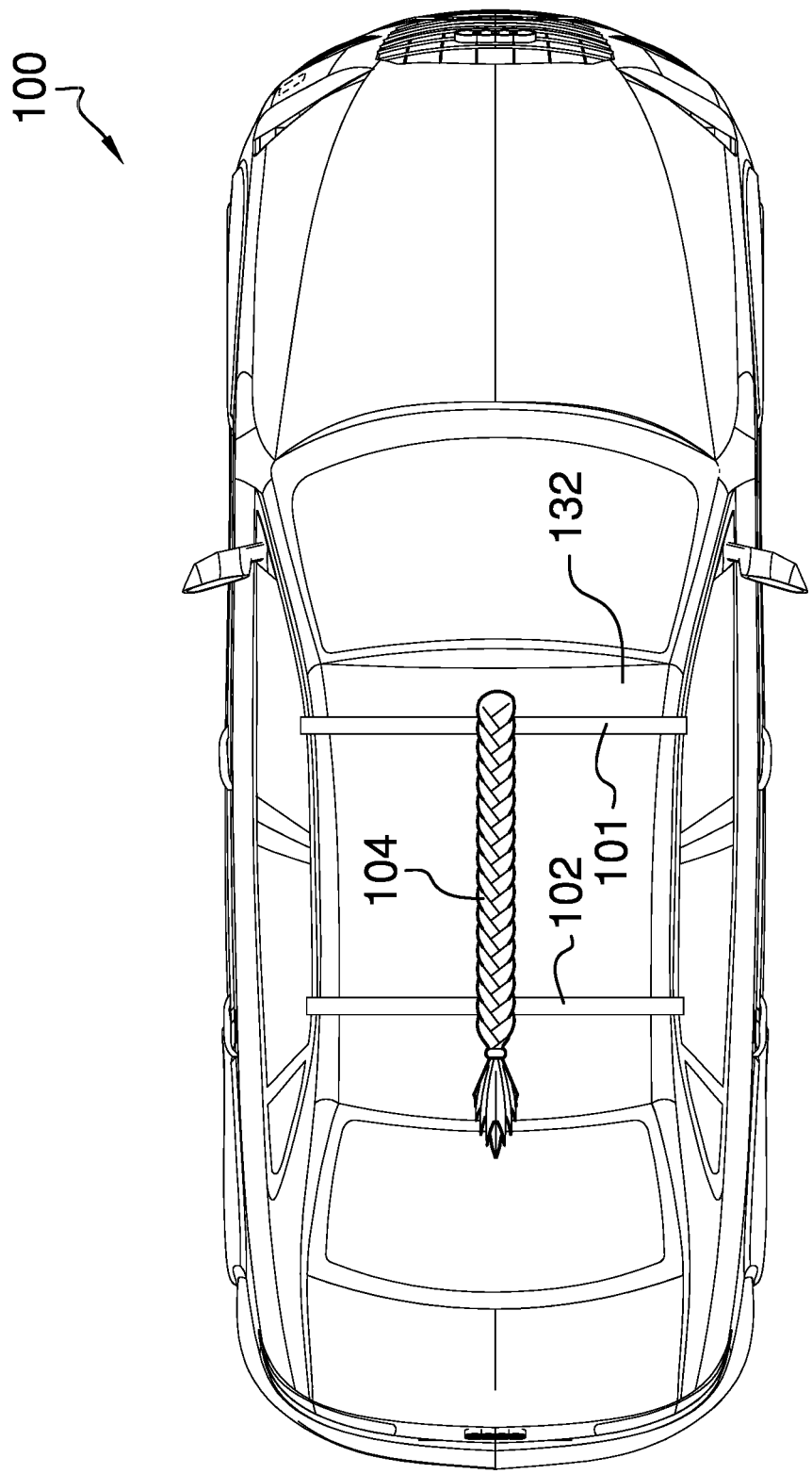
FIG. 6 is a top view of an alternate embodiment of the disclosure.
Figure 7:
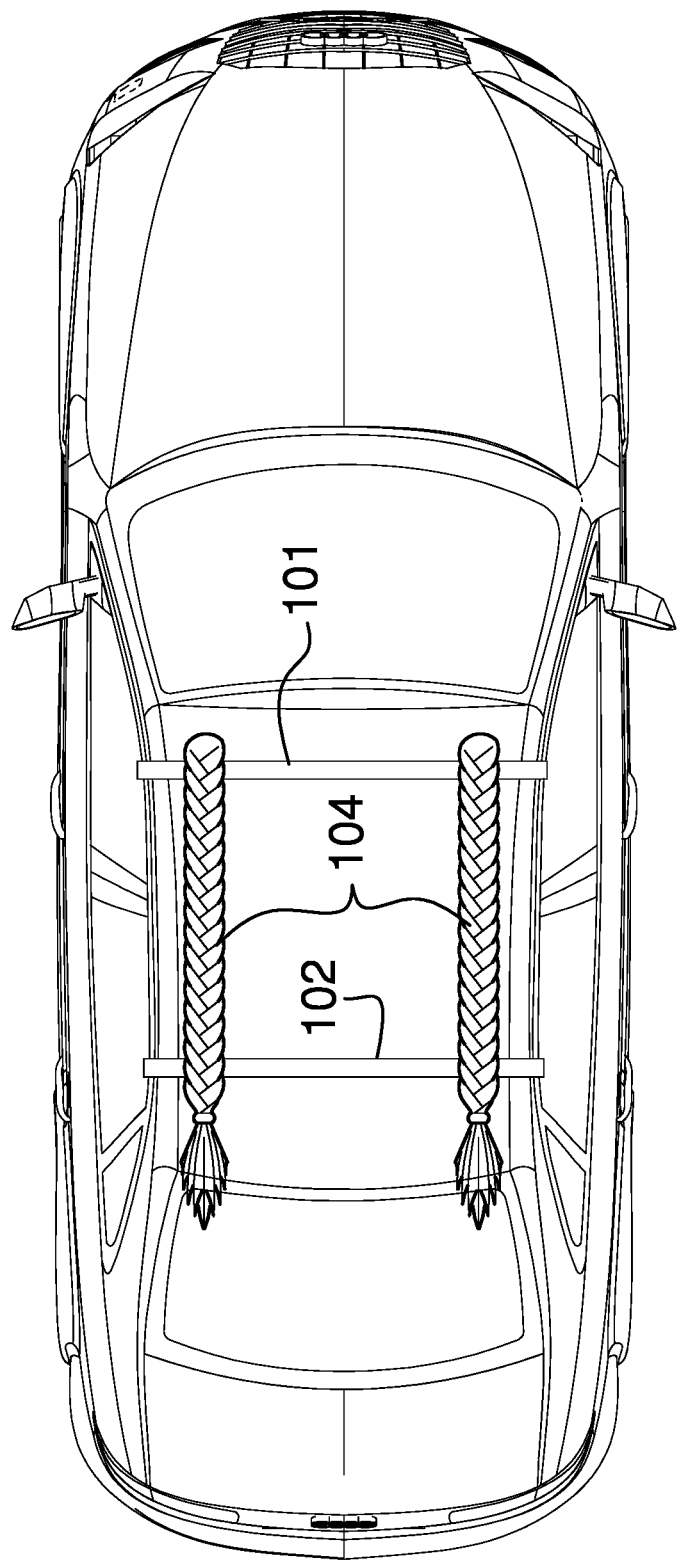
FIG. 7 is a top view of an alternate embodiment of the disclosure.
Figure 8:
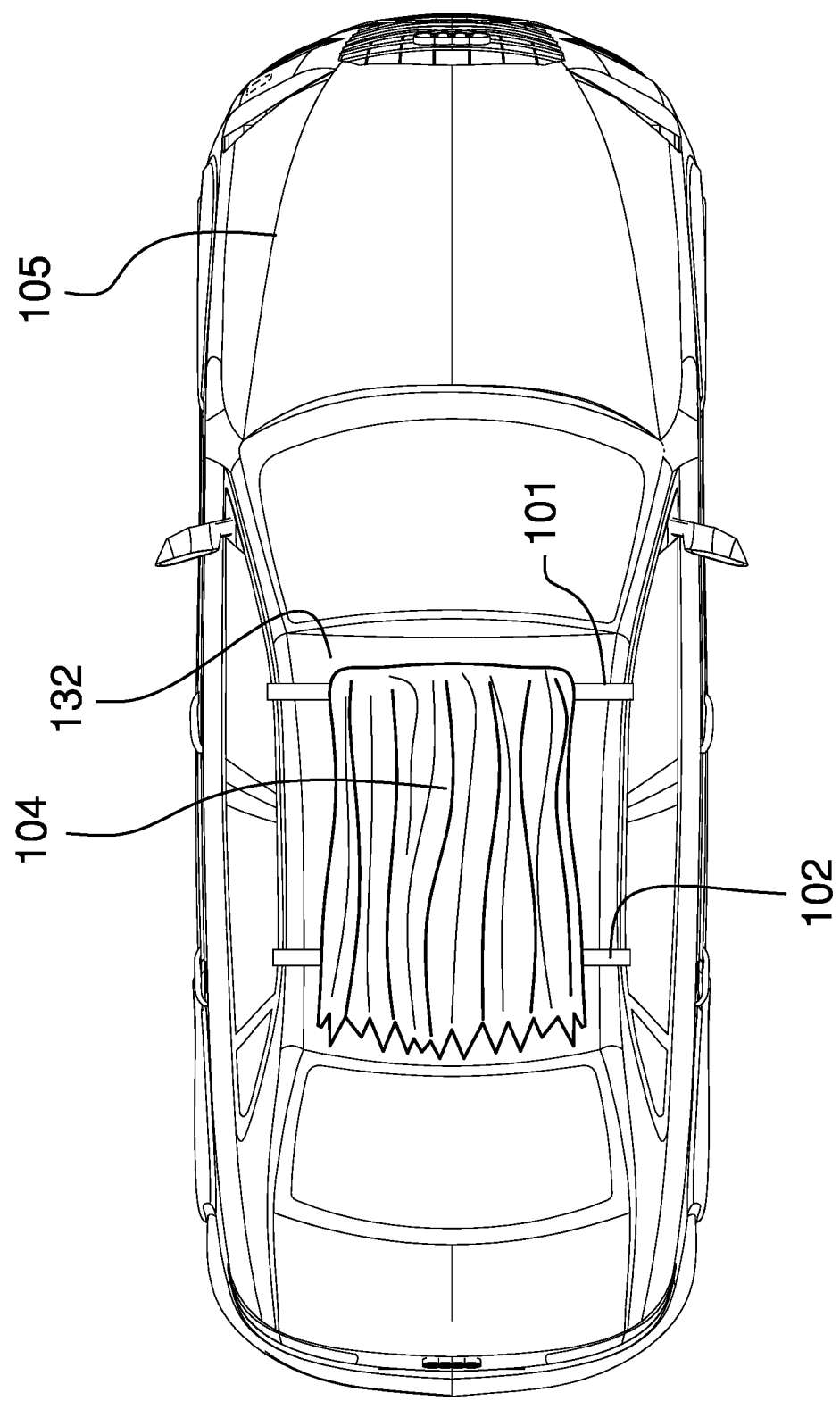
FIG. 8 is a top view of an alternate embodiment of the disclosure.

Detailed reference will now be made to one or more potential embodiments of the disclosure, which are illustrated in FIGS. 1 through 8.

The simulated hair for a vehicle 100 (hereinafter invention) is a decorated vehicle 105. The invention 100 comprises a forward strap structure 101, an aft strap structure 102, a sacrificial textile 103, a decorative structure 104, and a vehicle 105. The vehicle 105 further comprises a vehicle 105 cab 131 and a vehicle 105 roof 132. The decorative structure 104, the forward strap structure 101, and the aft strap structure 102 attach to the sacrificial textile 103. The forward strap structure 101 and the aft strap structure 102 secure the sacrificial textile 103 and the decorative structure 104 to the vehicle 105 roof 132.

The vehicle 105 is defined elsewhere in this disclosure. The vehicle 105 cab 131 is defined elsewhere in this disclosure.

The sacrificial textile 103 is a sheeting structure. The sacrificial textile 103 is formed as a textile. The sacrificial textile 103 forms a pedestal structure that separates the decorative structure 104 from the vehicle 105 roof 132. The sacrificial textile 103 is a protective structure that prevents damage to the vehicle 105 roof 132 from the decorative structure 104.

The decorative structure 104 is a puppet. The sacrificial textile 103 permanently attaches to the superior face of the sacrificial textile 103. The decorative structure 104 is formed as an indicia. The indicia presented by the decorative structure 104 is visible from the exterior of the vehicle 105. The indicia displayed by the decorative structure 104 stimulates a sentiment of a hair style in an observer. By hair style is meant a visible and commonly seen presentation of hair that would include, but is not limited to, a mohawk, a braided hair structure, a ponytail, and a wind-swept hair look. The decorative structure 104 mounts on the vehicle 105 roof 132 such that it appears that hair is growing from the vehicle 105 cab 131.

The forward strap structure 101 is a fastening device. The forward strap structure 101 permanently attaches to the superior face of the sacrificial textile 103. The forward strap structure 101 secures the sacrificial textile 103 and the decorative structure 104 to the vehicle 105 roof 132. The forward strap structure 101 removably attaches the sacrificial textile 103 and the decorative structure 104 to the vehicle 105. The forward strap structure 101 mounts on the vehicle 105 roof 132 in a forward position relative to the aft strap structure 102. The forward strap structure 101 is an adjustable structure. By adjustable is meant that the span of the length of the forward strap structure 101 adjusts to accommodate variations in the size of different vehicle 105 that may be selected to receive the invention 100. The forward strap structure 101 comprises a forward webbing 111, a forward quick release buckle 112, and a forward plurality of ring and slider apparatus 113.

The forward webbing 111 is a load bearing structure. The forward webbing 111 has a tensile strength but does not have a compressive strength. The forward webbing 111 forms a load path that transfers a portion of the load of the invention 100 to the vehicle 105 roof 132. The forward webbing 111 binds the sacrificial textile 103 and the decorative structure 104 to the vehicle 105 roof 132. The forward webbing 111 forms a loop around the vehicle 105 roof 132 such that the forward webbing 111 passes through the vehicle 105 cab 131.

The forward quick release buckle 112 is a quick release buckle. The forward quick release buckle 112 detachably attaches the forward webbing 111 to itself. The forward quick release buckle 112 forms the loop structure that binds the forward webbing 111 to the vehicle 105 roof 132. The forward quick release buckle 112 secures: a) the edge of the perimeter of the face of the forward webbing 111 with the least span of length; to, b) the edge of the perimeter of the face of the forward webbing 111 that is distal from the edge of the perimeter with the least span of length.

Each ring and slider arrangement selected from the forward plurality of ring and slider apparatus 113 is an apparatus that attaches to the forward webbing 111. Each selected ring and slider arrangement adjusts the span of the length of the forward webbing 111. The span of the length of the forward strap structure 101 adjusts by adjusting one or more ring and slider arrangements selected from the forward plurality of ring and slider apparatus 113. The forward plurality of ring and slider apparatus 113 further comprises a forward left side ring and slider apparatus 114 and a forward right side ring and slider apparatus 115.

The forward webbing 111 is a flexible structure. The forward left side ring and slider apparatus 114 is a ring and slider arrangement selected from the forward plurality of ring and slider apparatus 113. The forward left side ring and slider apparatus 114 attaches to the forward webbing 111. The forward left side ring and slider apparatus 114 adjusts the span of the length of the forward webbing 111. The forward left side ring and slider apparatus 114 is positioned along the forward webbing 111 such that the forward left side ring and slider apparatus 114 is on the left side of the vehicle 105 relative to the forward right side ring and slider apparatus 115.

The forward right side ring and slider apparatus 115 is a ring and slider arrangement selected from the forward plurality of ring and slider apparatus 113. The forward right side ring and slider apparatus 115 attaches to the forward webbing 111. The forward right side ring and slider apparatus 115 adjusts the span of the length of the forward webbing 111. The forward right side ring and slider apparatus 115 is positioned along the forward webbing 111 such that the forward right side ring and slider apparatus 115 is on the right side of the vehicle 105 relative to the forward left side ring and slider apparatus 114.

Both the forward left side ring and slider apparatus 114 and the forward right side ring and slider apparatus 115 can be used to adjust the span of the length of the forward webbing 111. The selection between the forward left side ring and slider apparatus and the forward right side ring and slider apparatus 115 will be based on the side of the vehicle 105 that the invention 100 is installed from.

The aft strap structure 102 is a fastening device. The aft strap structure 102 permanently attaches to the superior face of the sacrificial textile 103. The aft strap structure 102 secures the sacrificial textile 103 and the decorative structure 104 to the vehicle 105 roof 132. The aft strap structure 102 removably attaches the sacrificial textile 103 and the decorative structure 104 to the vehicle 105. The aft strap structure 102 mounts on the vehicle 105 roof 132 in an aft position relative to the forward strap structure 101. The aft strap structure 102 is an adjustable structure. By adjustable is meant that the span of the length of the aft strap structure 102 adjusts to accommodate variations in the size of different vehicle 105 that may be selected to receive the invention 100. The aft strap structure 102 comprises an aft webbing 121, an aft quick release buckle 122, and an aft plurality of ring and slider apparatus 123.

The aft webbing 121 is a flexible structure. The aft webbing 121 is a load bearing structure. The aft webbing 121 has a tensile strength but does not have a compressive strength. The aft webbing 121 forms a load path that transfers a portion of the load of the invention 100 to the vehicle 105 roof 132. The aft webbing 121 binds the sacrificial textile 103 and the decorative structure 104 to the vehicle 105 roof 132. The aft webbing 121 forms a loop around the vehicle 105 roof 132 such that the aft webbing 121 passes through the vehicle 105 cab 131.

The aft quick release buckle 122 is a quick release buckle. The aft quick release buckle 122 detachably attaches the aft webbing 121 to itself. The aft quick release buckle 122 forms the loop structure that binds the aft webbing 121 to the vehicle 105 roof 132. The aft quick release buckle 122 secures: a) the edge of the perimeter of the face of the aft webbing 121 with the least span of length; to, b) the edge of the perimeter of the face of the aft webbing 121 that is distal from the edge of the perimeter with the least span of length.

Each ring and slider arrangement selected from the aft plurality of ring and slider apparatus 123 is an apparatus that attaches to the aft webbing 121. Each selected ring and slider arrangement adjusts the span of the length of the aft webbing 121. The span of the length of the forward strap structure 101 adjusts by adjusting one or more ring and slider arrangements selected from the aft plurality of ring and slider apparatus 123. The aft plurality of ring and slider apparatus 123 further comprises an aft left side ring and slider apparatus 124 and an aft right side ring and slider apparatus 125.

The aft left side ring and slider apparatus 124 is a ring and slider arrangement selected from the aft plurality of ring and slider apparatus 123. The aft left side ring and slider apparatus 124 attaches to the aft webbing 121. The aft left side ring and slider apparatus 124 adjusts the span of the length of the aft webbing 121. The aft left side ring and slider apparatus 124 is positioned along the aft webbing 121 such that the aft left side ring and slider apparatus 124 is on the left side of the vehicle 105 relative to the aft right side ring and slider apparatus 125.

The aft right side ring and slider apparatus 125 is a ring and slider arrangement selected from the aft plurality of ring and slider apparatus 123. The aft right side ring and slider apparatus 125 attaches to the aft webbing 121. The aft right side ring and slider apparatus 125 adjusts the span of the length of the aft webbing 121. The aft right side ring and slider apparatus 125 is positioned along the aft webbing 121 such that the aft right side ring and slider apparatus 125 is on the right side of the vehicle 105 relative to the aft left side ring and slider apparatus 124.

Both the aft left side ring and slider apparatus 124 and the aft right side ring and slider apparatus 125 can be used to adjust the span of the length of the aft webbing 121. The selection between the aft left side ring and slider apparatus 124 and the aft right side ring and slider apparatus 125 will be based on the side of the vehicle 105 that the invention 100 is installed from.

In a second potential embodiment of the disclosure, the forward strap structure 101 further comprises a plurality of forward magnets 141. The plurality of forward magnets 141 attaches to the face of the forward webbing 111 such that the plurality of forward magnets 141 magnetically secure the forward strap structure 101 to the vehicle 105 roof 132. The aft strap structure 102 further comprises a plurality of aft magnets 142. The plurality of aft magnets 142 attaches to the face of the forward quick release buckle 112 such that the plurality of aft magnets 142 magnetically secure the forward strap structure 101 to the vehicle 105 roof 132.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Bind: As used in this disclosure, to bind is a verb that means to tie or secure a first object to a second object using a strap, cord, or webbing. Bind can also mean to tie or secure a plurality of similar first objects together by wrapping a second object around the plurality of similar first objects.

Bow: As used in this disclosure, the bow refers to the anterior side of an object, vehicle, or vessel. Specifically, the bow refers to the structure that leads the object, vehicle, or vessel into the primary sense of direction of the object vehicle, or vessel.

Braid: As used in this disclosure, a braid is a prism shaped structure made by intertwining a plurality prism structures in a definite pattern to form a lateral prism structure. As a verb, to braid refers to the process of forming a braid.

Brush: As used in this disclosure, a brush is a tool comprising a plurality of bristles set into a handle or a base that is used for grooming, sweeping, smoothing, cleaning, scrubbing, or painting.

Buckle: As used in this disclosure, a buckle is a fastening device that is used for joining a first free end of a strap to a second free end of the same strap or a different strap. A buckle further comprises a first (also called the male) connector that is attached to the first free end and a second (also called the female) connector that is attached to the second free end. The male connector has a pin or other structure that is generally caught by a structure formed in the female connector.

Decorative: As used in this disclosure, decorative is an adjective that refers to a first object or item that is used with a second object or item of the purpose of making the second object or item more interesting or attractive. Decorative will generally, but not necessarily, implies making the second object or item more visually attractive.

Force of Gravity: As used in this disclosure, the force of gravity refers to a vector that indicates the direction of the pull of gravity on an object at or near the surface of the earth.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition. See Label and Pattern.

Indicia: As used in this disclosure, the term indicia refers to a set of markings that identify a sentiment. See sentiment.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e., a north pole will attract a south pole).

Pedestal: As used in this disclosure, a pedestal is an intermediary load bearing structure that forms a load path between a supporting surface and an object, structure, or other load path.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Puppet: As used in this disclosure, a puppet is a three-dimensional figure resembling a human, animal or symbolic image that can be moved and that is used for decorative, entertainment, or educational purposes. A hand puppet refers to a puppet wherein a hand is inserted within the hand puppet such that movements of the hand with the hand puppet will cause the hand puppet to move. Hand puppets are commonly available. Hand puppets are often made from textile materials.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Roof: As used in this disclosure, a roof refers to the superior surface of a hollow structure. The roof typically encloses the hollow structure. The interior surface of the roof of a vehicle is often called a headliner.

Sacrificial Structure: As used in this disclosure, a sacrificial structure is a first object or structure that protects a second object or structure from damage. More specifically, the sacrificial structure protects the second object or structure by being damaged instead of the second object or structure.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, a laser bonded seam, a radio frequency (RF) bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sentiment: As used in this disclosure, a sentiment refers to a symbolic meaning or message that is communicated through the use of an object or an image, potentially including a text based image. See image and optical character recognition.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Textile: As used in this disclosure, a textile is a material that is woven, knitted, braided, or felted. Synonyms in common usage for this definition include fabric and cloth. The two surfaces of the textile with the greatest surface area are called the faces of the textile.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A simulated hair for a vehicle comprising
a forward strap structure, an aft strap structure, a sacrificial textile, a decorative structure, and a vehicle;
wherein the vehicle further comprises a vehicle cab and a vehicle roof;
wherein the decorative structure, the forward strap structure, and the aft strap structure attach to the sacrificial textile;
wherein the forward strap structure and the aft strap structure secure the sacrificial textile and the decorative structure to the vehicle roof;
wherein the sacrificial textile forms a pedestal structure that separates the decorative structure from the vehicle roof;
wherein the decorative structure is formed as an indicia;
wherein the indicia presented by the decorative structure is visible from the exterior of the vehicle;
wherein the indicia displayed by the decorative structure stimulates a sentiment of a hair style in an observer;
wherein the decorative structure mounts on the vehicle roof such that it appears that hair is growing from the vehicle cab.

2. The simulated hair for a vehicle according to claim 1
wherein the sacrificial textile is a sheeting structure;
wherein the sacrificial textile is formed as a textile.

3. The simulated hair for a vehicle according to claim 2
wherein the decorative structure is a puppet;
wherein the decorative structure permanently attaches to the superior face of the sacrificial textile.

4. The simulated hair for a vehicle according to claim 3
wherein the forward strap structure is a fastening device;
wherein the forward strap structure permanently attaches to the superior face of the sacrificial textile;
wherein the forward strap structure secures the sacrificial textile and the decorative structure to the vehicle roof;
wherein the forward strap structure removably attaches the sacrificial textile and the decorative structure to the vehicle;
wherein the forward strap structure mounts on the vehicle roof in a forward position relative to the aft strap structure.

5. The simulated hair for a vehicle according to claim 4
wherein the aft strap structure is a fastening device;
wherein the aft strap structure permanently attaches to the superior face of the sacrificial textile;
wherein the aft strap structure secures the sacrificial textile and the decorative structure to the vehicle roof;
wherein the aft strap structure removably attaches the sacrificial textile and the decorative structure to the vehicle;
wherein the aft strap structure mounts on the vehicle roof in an aft position relative to the forward strap structure.

6. The simulated hair for a vehicle according to claim 5
wherein the forward strap structure is an adjustable structure;
wherein by adjustable is meant that the span of the length of the forward strap structure adjusts to accommodate variations in the size of different vehicle that may be selected to receive the simulated hair for a vehicle.

7. The simulated hair for a vehicle according to claim 6
wherein the aft strap structure is an adjustable structure;
wherein by adjustable is meant that the span of the length of the aft strap structure adjusts to accommodate variations in the size of different vehicle that may be selected to receive the simulated hair for a vehicle.

8. The simulated hair for a vehicle according to claim 7
wherein the forward strap structure comprises a forward webbing, a forward quick release buckle, and a forward plurality of ring and slider apparatus;
wherein the forward webbing is a load bearing structure;
wherein the forward quick release buckle detachably attaches the forward webbing to itself;
wherein each ring and slider arrangement selected from the forward plurality of ring and slider apparatus is an apparatus that attaches to the forward webbing;
wherein the aft strap structure comprises an aft webbing, an aft quick release buckle, and an aft plurality of ring and slider apparatus;
wherein the aft webbing forms a load path that transfers a portion of the load of the simulated hair for a vehicle to the vehicle roof;
wherein the aft quick release buckle detachably attaches the aft webbing to itself;
wherein each ring and slider arrangement selected from the aft plurality of ring and slider apparatus is an apparatus that attaches to the aft webbing.

9. The simulated hair for a vehicle according to claim 8
wherein the forward webbing is a flexible structure;
wherein the forward webbing is a load bearing structure;
wherein the forward webbing has a tensile strength but does not have a compressive strength;
wherein the forward webbing forms a load path that transfers a portion of the load of the simulated hair for a vehicle to the vehicle roof;

wherein the forward webbing binds the sacrificial textile and the decorative structure to the vehicle roof;

wherein the forward webbing forms a loop around the vehicle roof such that the forward webbing passes through the vehicle cab;

wherein the aft webbing is a flexible structure;

wherein the aft webbing is a load bearing structure;

wherein the aft webbing has a tensile strength but does not have a compressive strength;

wherein the aft webbing binds the sacrificial textile and the decorative structure to the vehicle roof;

wherein the aft webbing forms a loop around the vehicle roof such that the aft webbing passes through the vehicle cab.

10. The simulated hair for a vehicle according to claim 9 wherein the forward quick release buckle is a quick release buckle;

wherein the forward quick release buckle forms the loop structure that binds the forward webbing to the vehicle roof;

wherein the forward quick release buckle secures: a) the edge of the perimeter of the face of the forward webbing with the least span of length; to, b) the edge of the perimeter of the face of the forward webbing that is distal from the edge of the perimeter with the least span of length;

wherein the aft quick release buckle is a quick release buckle;

wherein the aft quick release buckle forms the loop structure that binds the aft webbing to the vehicle roof;

wherein the aft quick release buckle secures: a) the edge of the perimeter of the face of the aft webbing with the least span of length; to, b) the edge of the perimeter of the face of the aft webbing that is distal from the edge of the perimeter with the least span of length.

11. The simulated hair for a vehicle according to claim 10 wherein each ring and slider arrangement selected from the forward plurality of ring and slider apparatus is an apparatus that attaches to the forward webbing;

wherein the aft quick release buckle is a quick release buckle;

wherein the aft quick release buckle forms the loop structure that binds the aft webbing to the vehicle roof;

wherein the aft quick release buckle secures: a) edge of the perimeter of the face of the aft webbing with the least span of length; to, b) the edge of the perimeter of the face of the aft webbing that is distal from the edge of the perimeter with the least span of length.

12. The simulated hair for a vehicle according to claim 11 wherein the forward plurality of ring and slider apparatus further comprises a forward left side ring and slider apparatus and a forward right side ring and slider apparatus;

wherein the forward left side ring and slider apparatus is a ring and slider arrangement selected from the forward plurality of ring and slider apparatus;

wherein the forward left side ring and slider apparatus attaches to the forward webbing;

wherein the forward left side ring and slider apparatus adjusts the span of the length of the forward webbing;

wherein the forward left side ring and slider apparatus is positioned along the forward webbing such that the forward left side ring and slider apparatus is on the left side of the vehicle relative to the forward right side ring and slider apparatus;

wherein the forward right side ring and slider apparatus is a ring and slider arrangement selected from the forward plurality of ring and slider apparatus;

wherein the forward right side ring and slider apparatus attaches to the forward webbing;

wherein the forward right side ring and slider apparatus adjusts the span of the length of the forward webbing;

wherein the forward right side ring and slider apparatus is positioned along the forward webbing such that the forward right side ring and slider apparatus is on the right side of the vehicle relative to the forward left side ring and slider apparatus.

13. The simulated hair for a vehicle according to claim 12 wherein each selected ring and slider arrangement adjusts the span of the length of the aft webbing;

wherein the span of the length of the forward strap structure adjusts by adjusting one or more ring and slider arrangements selected from the aft plurality of ring and slider apparatus;

wherein the aft plurality of ring and slider apparatus further comprises an aft left side ring and slider apparatus and an aft right side ring and slider apparatus;

wherein the aft left side ring and slider apparatus is a ring and slider arrangement selected from the aft plurality of ring and slider apparatus;

wherein the aft left side ring and slider apparatus attaches to the aft webbing;

wherein the aft left side ring and slider apparatus adjusts the span of the length of the aft webbing;

wherein the aft left side ring and slider apparatus is positioned along the aft webbing such that the aft left side ring and slider apparatus is on the left side of the vehicle relative to the aft right side ring and slider apparatus;

wherein the aft right side ring and slider apparatus is a ring and slider arrangement selected from the aft plurality of ring and slider apparatus;

wherein the aft right side ring and slider apparatus attaches to the aft webbing;

wherein the aft right side ring and slider apparatus adjusts the span of the length of the aft webbing;

wherein the aft right side ring and slider apparatus is positioned along the aft webbing such that the aft right side ring and slider apparatus is on the right side of the vehicle relative to the aft left side ring and slider apparatus;

wherein both the aft left side ring and slider apparatus and the aft right side ring and slider apparatus can be used to adjust the span of the length of the aft webbing;

wherein the selection between the aft left side ring and slider apparatus and the aft right side ring and slider apparatus will be based on the side of the vehicle that the simulated hair for a vehicle is installed from.

14. The simulated hair for a vehicle according to claim 13 wherein the forward strap structure further comprises a plurality of forward magnets;

wherein the plurality of forward magnets attaches to the face of the forward webbing such that the plurality of forward magnets magnetically secure the forward strap structure to the vehicle roof;

wherein the aft strap structure further comprises a plurality of aft magnets;

wherein the plurality of aft magnets attaches to the face of the forward quick release buckle such that the plurality of aft magnets magnetically secure the forward strap structure to the vehicle roof.

* * * * *